United States Patent [19]

Slater

[11] Patent Number: 5,001,894

[45] Date of Patent: Mar. 26, 1991

[54] BEARING GUARD FOR COMPOST TURNER

[76] Inventor: James A. Slater, 10151 N. Brickyard Rd., Holton, Mich. 49425

[21] Appl. No.: 433,545

[22] Filed: Nov. 8, 1989

[51] Int. Cl.[5] .................. A01D 84/00; B01F 15/00
[52] U.S. Cl. ................................ 56/372; 366/345
[58] Field of Search .......... 56/372, 370, 1, DIG. 5, 56/DIG. 20, DIG. 21, DIG. 24; 366/327, 345, 346

[56] References Cited

U.S. PATENT DOCUMENTS

| 3,369,797 | 2/1968 | Cobey | 56/372 |
| 3,733,033 | 5/1973 | Cobey | 366/345 |
| 4,478,520 | 10/1984 | Cobey | 366/345 |

Primary Examiner—Ramon S. Britts
Assistant Examiner—Terry Lee Melius
Attorney, Agent, or Firm—Price, Heneveld, Cooper, DeWitt & Litton

[57] ABSTRACT

A compost turner including a rotatable mandrel supported by a shaft and at least one bearing includes a guard for reducing the tendency of polymeric garbage bags to wrap around the mandrel shaft and foul the bearing. The guard includes stationary cutting members mounted to a bearing support and rotating cutting members mounted to the mandrel which interact with the stationary guard members to shred garbage bags into harmless pieces.

24 Claims, 3 Drawing Sheets

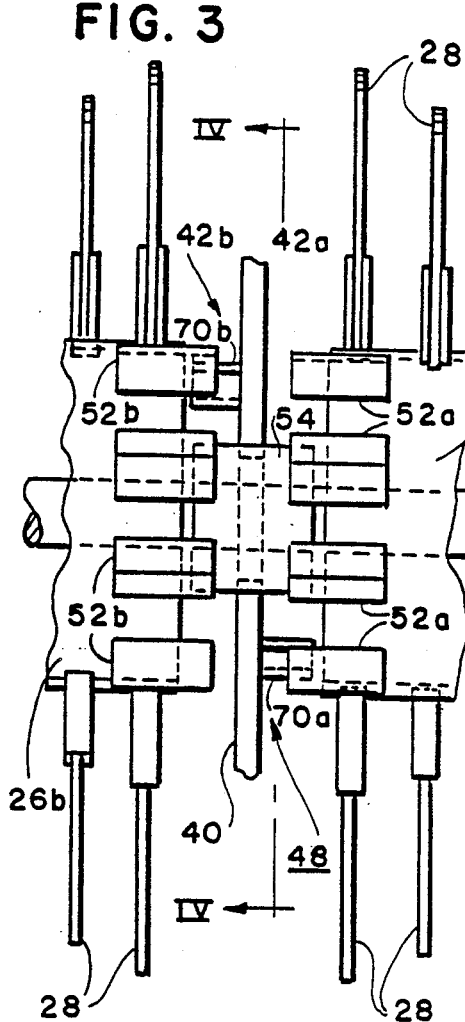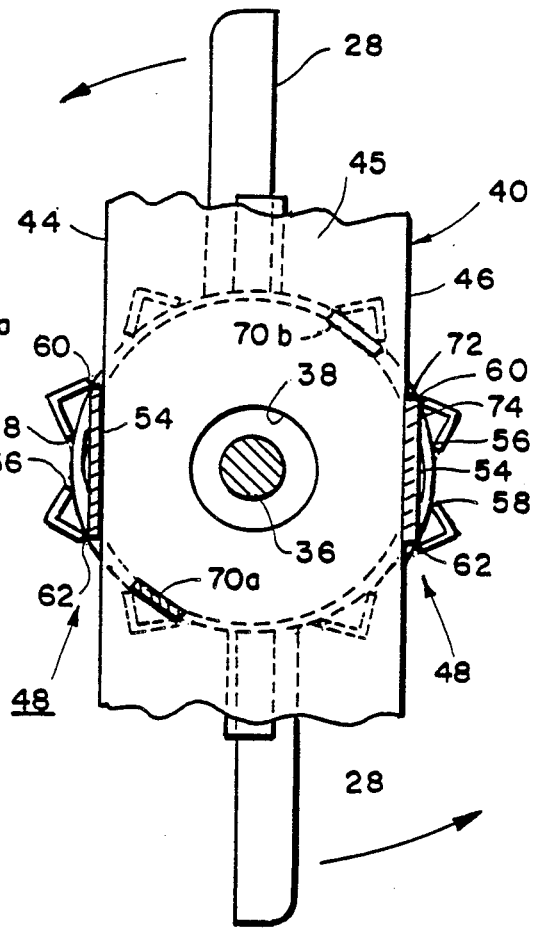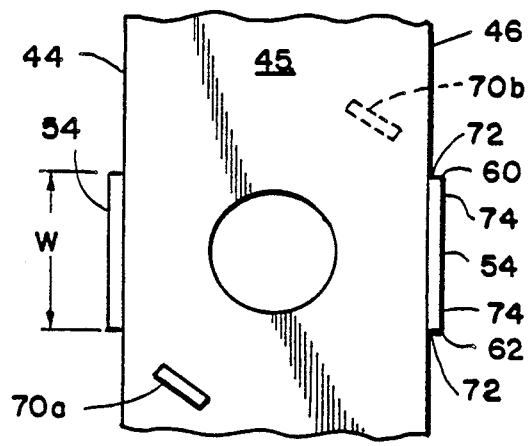

BEARING GUARD FOR COMPOST TURNER

BACKGROUND OF THE INVENTION

This invention relates to bearing guards The invention is especially adapted for guarding the bearing of a rotating mandrel of a compost turner, or aerator, from entanglement by polymeric bags used to haul leaves, grass clippings and the like.

A problem of immense proportion in the United States and throughout the world is the dwindling availability of landfill sites. Up to 40% of the volume of landfills, depending on the time of the year, is occupied by yard waste such as leaves, grass clippings and the like. One solution is to recycle such waste by converting it to topsoil through composting. Composting utilizes naturally occurring organisms to convert dead plant matter into a form that growing plants can use again. In order to be commercially feasible, it is necessary to process large volumes of yard waste in the least possible time. One method under consideration includes the arranging of yard waste in long piles known as windrows. The windrows must be occasionally churned to maintain the proper composition, temperature, moisture and oxygen levels. The internal temperature of the windrow must be maintained between 100 and 140° F. for rapid decomposition.

Compost turners, or aerators, have been developed for churning the windrows. One problem that has developed is that yard waste is often received by municipalities in polyethylene bags, commonly known as garbage bags. Such bags have a tendency to wrap around the shaft of the turning mandrel and foul its support bearing, significantly reducing the bearings' useful life.

SUMMARY OF THE INVENTION

In order to significantly enhance the useful life of mandrel bearings in compost turners, a unique bearing guard is proposed. The guard provides shredding means for shredding articles in the vicinity of the bearing. In this manner, articles such as polymeric bags are shredded into pieces of a size that do not have a tendency to wrap around the mandrel shaft where they may readily foul the bearing. Instead, the small pieces fall away from the bearing. These and other objects, advantages and features of this invention will become apparent upon review of the following specification in conjunction with the drawings.

BRIEF DESCRIPTION OF THE DRAWINGS

FIG. 3 is an enlarged partial front view of the mandrel bearing portion of the compost turner in FIG. 1;

FIG. 4 is a sectional view taken along the lines IV—IV in FIG. 3;

FIG. 5 is a partial front view illustrating the support plate for the bearing to which the present invention is applied;

FIG. 6 is a side view of the bearing support plate in FIG. 5;

DESCRIPTION OF THE PREFERRED EMBODIMENT

Figure 1:
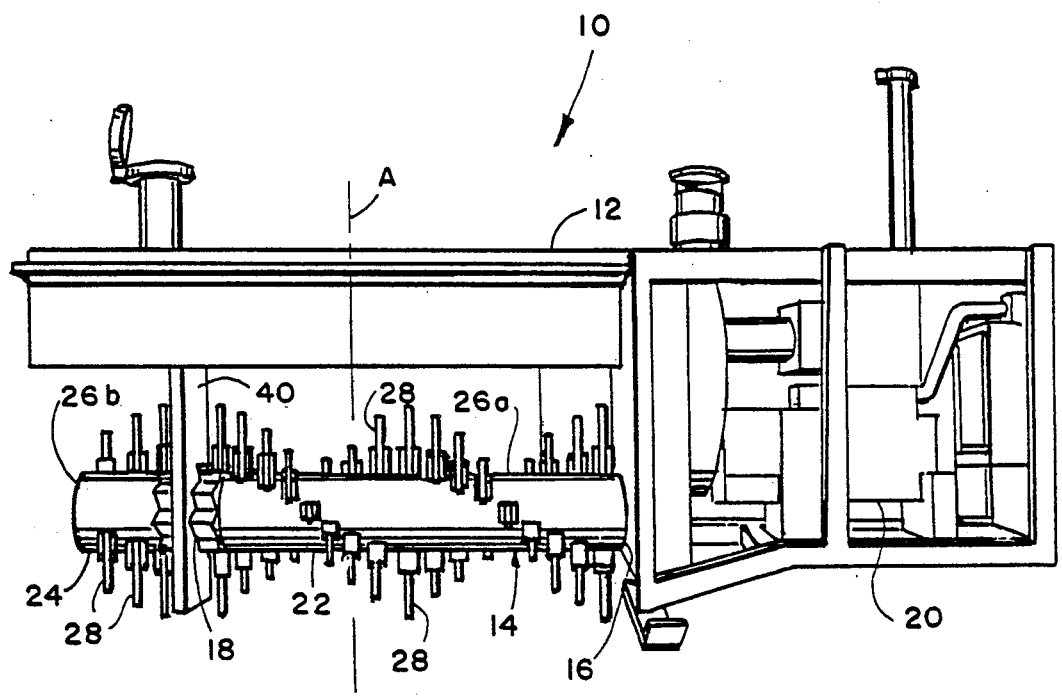
FIG. 1 is a front perspective view of a compost turner, or aerator, in which the present invention is especially useful.
Figure 2:
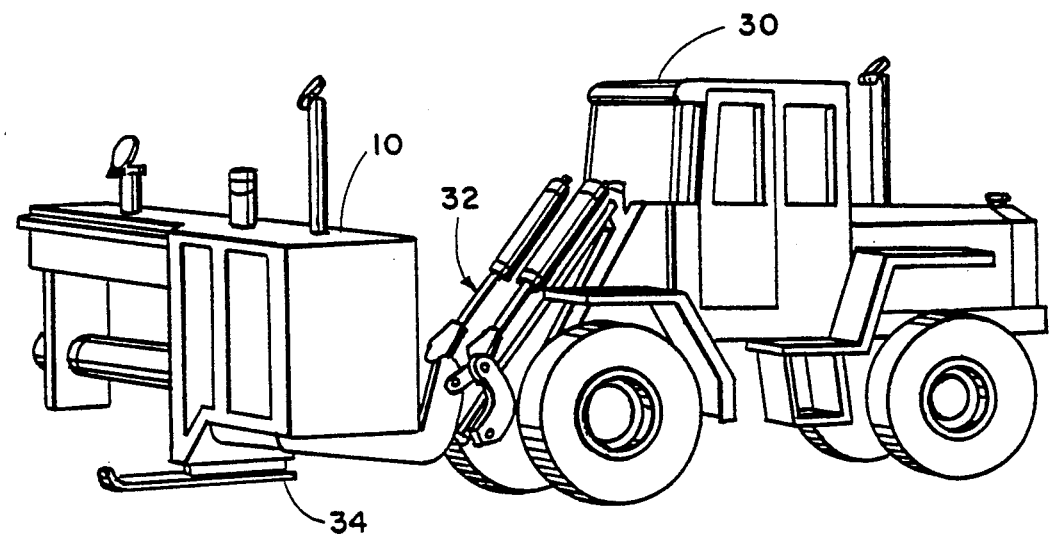
FIG. 2 is a side perspective view illustrating the compost turner in FIG. 1 as it is used.
Figure 7:
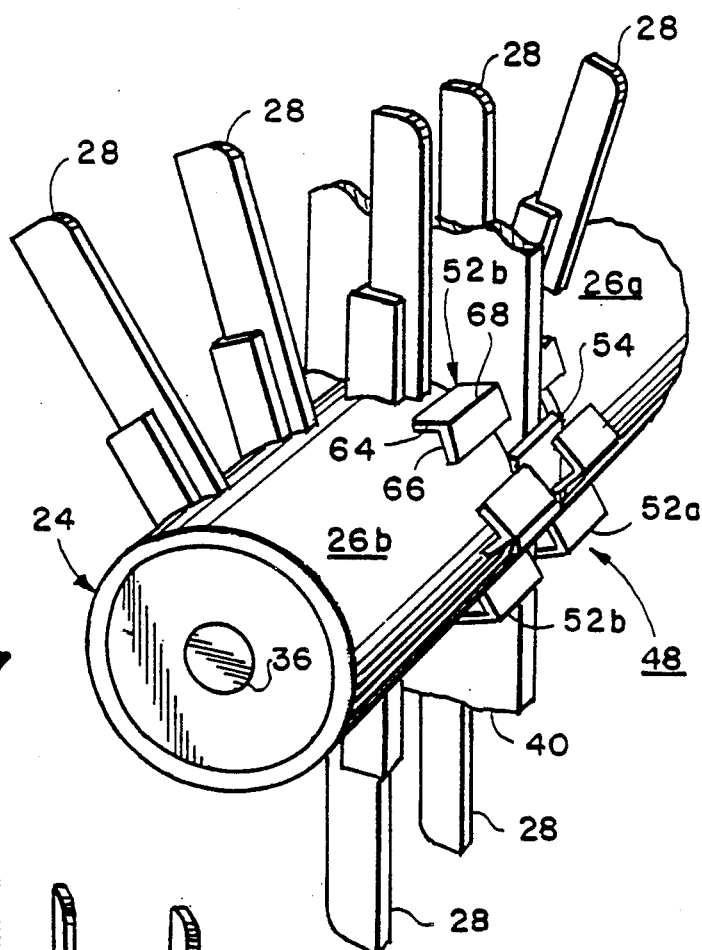
FIG. 7 is a perspective view illustrating the invention.
Figure 8:
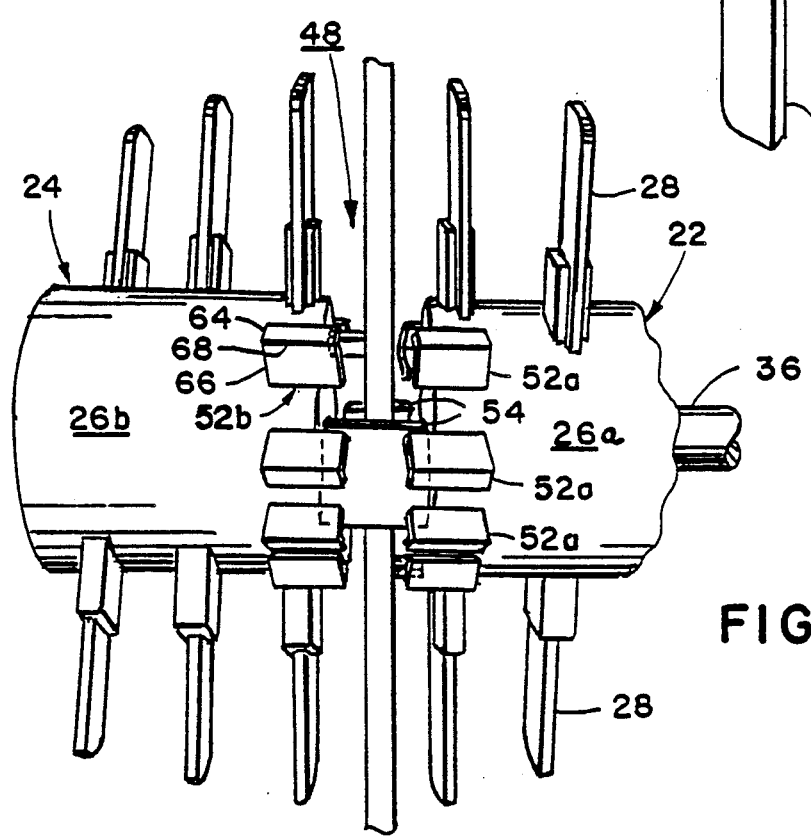
FIG. 8 is a front perspective view illustrating the invention.

Referring now specifically to the drawings, and the illustrative embodiments depicted therein, a compost turner, or aerator, 10 includes a frame 12 and a turning mandrel 14 rotatably supported with respect to frame 12 by an inboard bearing assembly (not shown) at an inboard support area 16 thereof by a bearing 38 at an outboard support area generally, shown at 18 (FIGS. 1 and 4). Mandrel 14 is rotated by an internal combustion engine 20 about a shaft 36 which extends through bearing 38. In FIG. 2, a compost turner 10 is shown in use with a tractor 30 which propels compost turner 10 along windrows. Tractor 30 includes hydraulically actuated lifting means 32 which may elevate compost turner 10 in order to churn the upper portions of tall windrows. Compost turner 10 may also be guided along the ground on a skid member 34. Compost turner 10 is commercially available and is marketed by Wildcat Manufacturing Company, Inc., of Freeman, S. Dak.

Outboard support area 18 is positioned inwardly of the outer end of mandrel 14 in order to reduce the length of mandrel 14 that is unsupported. This reduces the amount of shaft wobble. However, this divides mandrel 14 into first portion 22 located between inboard and outboard support areas 16, 18 and a second outboard portion 24 located outboard of outboard support area 18. Each portion 22, 24 includes a cylindrical surface 26a, 26b and a multiplicity of turning tines 28, extending generally perpendicularly from surface 26a, 26b. Tines 28 are arranged in spiraling rows around the perimeter of surface 26a, 26b. The tines 28 are oriented on surface 26a, 26b in a manner that will urge compost toward the longitudinal central plane of the mandrel, shown as A in FIG. 1. Thus, compost to the right of plane A, as viewed in FIG. 1, is urged toward the left and compost to the left of plane A is urged toward the right. The purpose of this arrangement is to urge the compost material toward the center of the windrow and thus to maintain the integrity of the windrow. However, this lateral urging of compost by tines 28 creates a tendency for material engaged by the tines on outer portion 24 to press against outboard support area 18. Bearing 38 is mounted to a support plate 40 extending vertically downwardly from frame 12 at outboard support area 18. Plate 40 includes a web portion 45 extending between a forward vertical edge 44 and a rearward vertical edge 46 thereof. A space, or passage, shown at 42a, 42b is defined between web portion 45 of plate 40 and surface 26a, 26b.

Many municipalities receive yard waste in large polymeric garbage bags. If the windrows are built in whole or in part with yard waste in such bags, the bags will be encountered by tines 28 during the compost churning process. Because tines 28 urge material towards the central plane A of mandrel 14, plastic bags encountered by tines 28 on outboard portion 24 are pressed against support area 18. Due to the rotational motion of mandrel 14, the bags have a tendency to wind around shaft 36, which supports mandrel 14, and enter bearing 38, thus fouling the races of the bearing.

In order to guard bearing 38 against the entry of polymeric bags, and the like, guard means generally shown at 48 are provided. Guard means 48 includes a first set of shearing members 52a, 52b positioned on surface 26a, 26b and second shearing members 54 mounted on support plate 40. First shearing members 52a, 52b move with the rotation of surface 26a, 26b and provide a shearing action with stationary shearing members 54. Shearing members 52a, 52b are spaced around the perimeter of surface 26a, 26b, except at areas occupied by the mounting of a tine 28, and extend laterally beyond surface 26a, 26b in the direction of support plate 40. Second shearing members 54 are positioned on forward and rearward vertical edges 44, 46 and extend in both directions toward surfaces 26a and 26b such that there is considerable overlap of shearing members 52a and 52b with respective portions of second shearing members 54.

As best seen by reference to FIG. 4, each shearing member 52a, 52b defines a pair of peripheral edges 56, 58 which are flush with surface 26a, 26b. Each shearing member 54 includes a pair of peripheral edges 60, 62 which are positioned to be aligned with surfaces 26a and 26b. In this manner, as mandrel 14 rotates, shearing members 52a, 52b will produce a shearing action with second shearing members 54 as each peripheral edge 56, 58 of each first shearing member registers with each peripheral edge 60, 62 of each shearing member 54. Thus, it is seen that a multiplicity of shearing edges register with one another at different times to produce shearing action as mandrel 14 rotates.

In the illustrated embodiment, first shearing members 52a, 52b are made from L-shaped metal members having first and second sides 64, 66 joined at a bight 68. The edges of surfaces 64, 66 opposite bight 68 define peripheral edges 56, 58 of each shearing member 52a, 52b. Each shearing member 52a, 52b is welded to surface 26a, 26b with bight 68 extending away from the surface. This aligns edges 56, 58 with surface 26a, 26b and provides a stable support engagement between shearing members 52a, 52b and the surface of the mandrel. The arrangement of sides 64 and 66 at right angles orients the surfaces of sides 64 and 66 that define edges 56, 58 at approximately 45° to surface 26a, 26b and positions edges 56 and 58 against surface 26a, 26b such that they are in proper orientation with edges 60, 62 of shearing members 54. Shearing members 54 are made from rectangular metal plate whose width W is preselected in order to position peripheral edges 60, 62 in alignment with surfaces 26a, 26b when members 54 are properly positioned on support plate 40. Surface portions 72, 74 of members 54 that define edges 60 and 62 are also oriented approximately 45° with respect to surface 26a, 26b. This produces a desirable shearing action between shearing members 52a, 52b and shearing member 54. In the illustrated embodiment, shearing members 52a, 52b are made from 0.25" thick angle steel. Shearing members 54 are made from 0.25" thick steel plate.

While second shearing members 54 are provided on opposite vertical edges 44, 46 of the support plate 40, it is additionally possible to provide one or more third shearing members 70a, 70b extending laterally from web portion 45 of support plate 40 toward one surface 26a, 26b in order to engage in a shearing motion with first shearing members 52a, 52b. The use of third shearing members 72a, 72b is optional and the selection and positioning of such would be well within the skill of the artisan. Third shearing members each include a pair of shearing edges 76, 78, both of which engage shearing members 52a, 52b.

The shearing action provided by the interface between first shearing members 52a, 52b with second shearing members 54 and third shearing members 70a, 70b, reduces polymeric bags to small portions that do not have a tendency to wrap multiple times around shaft 36. Thus, the tendency for the pieces of polymeric material to enter bearing 38 is reduced. Furthermore, the present invention makes use of the space 42a, 42b between support plate 40 and surfaces 26a, 26b to allow the shredded material to fall free of the mandrel.

While the invention has been illustrated and described in relationship to the bearing of a rotatable mandrel for a compost turner, its principles may find application in other environments. For example, a bearing guard according to the present invention may be applied to the beater bar of a vacuum cleaner in order to shred long threads into short thread portions and thereby reduce bearing damage as a result of the entwining of long threads around the beater bar bearing. Other changes and modifications in the specifically described embodiments can be carried out without departing from the principles of the invention which is intended to be limited only by the scope of the appended claims, as interpreted according to the principles of patent law, including the doctrine of equivalents.

I claim:

1. In a compost turner having a turning mandrel including means for engaging compost material by said mandrel to turn said compost material upon rotation of said mandrel, a bearing for rotatably supporting said mandrel, and means for rotating said mandrel, the improvement comprising:

a guard for said bearing for reducing the tendency of articles to become entangled in said bearing, said guard comprising shredding means overlying said bearing for shredding articles in the vicinity of said bearing into smaller article portions such that debris travelling toward said bearing will be shredded by said guard before reaching said bearing.

2. The compost turner in claim 1 wherein said bearing is mounted to a support member and wherein said shredding means includes a first shearing member mounted to said support member and a second shearing member mounted to said mandrel in a position to create a shearing action with said first shearing member as said mandrel is rotated by said rotating means.

3. The compost turner in claim 2 wherein said first shearing member defines a first shearing edge and said second shearing member defines a second shearing edge and wherein said first and second shearing edges are brought into shearing engagement as a portion of said second shearing member passes said first shearing member.

4. The compost turner in claim 3 wherein said second shearing member further defines a third shearing edge and wherein said first and third shearing edges are brought into shearing engagement as another portion of said second shearing member passes a portion of said first shearing member.

5. The compost turner in claim 4 wherein said second shearing member is made from a metal member having a pair of joined angle surfaces defining a pair of parallel peripheral edges and wherein said metal member is positioned on said mandrel such that said edges define said second and third shearing edges.

6. The compost turner in claim 5 wherein said first shearing member is made from a metal plate and wherein said first shearing edge is defined as a first peripheral edge of said metal plate.

7. In a compost turner having a turning mandrel including means for engaging compost material by said mandrel to turn said compost material upon rotation of said mandrel, a bearing mounted to a support member for rotatably supporting said mandrel, and means for rotating said mandrel, the improvement comprising:
  a guard for said bearing for reducing the tendency of articles to become entangled in said bearing, said guard comprising shredding means for shredding articles in the vicinity of said bearing;
  said shredding means including a first shearing member mounted to said support member and a second shearing member mounted to said mandrel in a position to create a shearing action with said first shearing member as said mandrel is rotated by said rotating means;
  said first shearing member being made from a metal plate including a first shearing edge defined as a first peripheral edge of said metal plate and a fourth shearing edge defined as a second peripheral edge of said metal plate at another portion of said first shearing member, said second peripheral edge being spaced from and parallel to said first shearing edge;
  said second shearing member defining a second shearing edge and a third shearing edge, said second shearing member being made from a metal member having a pair of joined angle surfaces defining a pair of parallel peripheral edges and wherein said metal member is positioned on said mandrel such that said peripheral edges define said second and third shearing edges; and
  wherein said first and second shearing edges are brought into close proximity as a portion of said second shearing member passes said first shearing member, wherein said first and third shearing edges are brought into close proximity as another portion of said second shearing member passes a portion of said first shearing member, wherein said second and fourth shearing edges are brought into close proximity as said portion of said second shearing member passes said another portion of said first shearing member and wherein said third and fourth shearing edges are brought into close proximity as said another portion of said second shearing member passes said another portion of said first shearing member.

8. A compost turner comprising:
  a frame;
  a mandrel having means defining a cylindrical surface, a shaft extending axially within said means and a multiplicity of tines extending outwardly from said surface for engaging and turning compost material;
  support means for rotatably mounting said mandrel to said frame including a bearing for rotatably supporting said shaft and a support member connected with said frame for supporting said bearing;
  engine means mounted to said frame and connected with said shaft for rotating said mandrel; and
  a guard for said bearing for reducing the tendency of articles to become entangled in said bearing said guard including a first shearing member mounted to said support member and a second shearing member mounted to said cylindrical surface, said first and second shearing members mounted in positions overlying said bearing in a manner that will create a shearing action between said first and second shearing members as said mandrel rotates such that debris travelling toward said bearing will be shredded by said guard before reaching said bearing.

9. The compost turner in claim 8 wherein said cylindrical surface defines an axial end adjacent said support member, said axial end being spaced from said support member such that pieces of an article sheared by said first and second shearing members will fall away from said mandrel.

10. A compost turner comprising:
  a frame;
  a mandrel having means defining a cylindrical surface, a shaft extending axially within said means and a multiplicity of tines extending outwardly from said surface for engaging and turning compost material;
  support means for rotatably mounting said mandrel to said frame including a bearing for rotatably supporting said shaft and a support member connected with said frame for supporting said bearing;
  engine means mounted to said frame and connected with said shaft for rotating said mandrel;
  a guard for said bearing for reducing the tendency of articles to become entangled in said bearing said guard including a first shearing member mounted to said support member, a second shearing member mounted to said cylindrical surface, a third shearing member mounted to said support member and a fourth shearing member mounted to said cylindrical surface;
  said first and second shearing members being mounted in positions that will create a shearing action between said first and second shearing members as said mandrel rotates;
  said third and fourth shearing members being mounted in positions that will create a shearing action between said third and fourth shearing members, between said first and third shearing members and between said second and fourth shearing members as said mandrel rotates; and
  said cylindrical surface defining an axial end adjacent said support member, said axial end being spaced from said support member such that pieces of an article sheared by said first and second shearing members will fall away from said mandrel.

11. The compost turner in claim 10 wherein each of said shearing members defines a pair of spaced apart parallel shearing edges such that shearing action will be created at various times between all shearing edges of said first and third shearing members and all shearing edges of said second and fourth shearing members.

12. The compost turner in claim 11 wherein said first and third shearing members are substantially planar metal plates having parallel peripheral edges defining said shearing edges thereof.

13. The compost turner in claim 12 wherein said second and fourth shearing members are L-shaped metal members having parallel peripheral edges defining said shearing edges thereof.

14. A compost turner comprising:
  a frame;
  a mandrel having means defining a cylindrical surface having a pair of surface portions, each of said surface portions having an end thereof spaced from the end of the other one of said surface portions, a shaft extending axially within said means and a multiplicity of tines extending outwardly from said surface portions for engaging and turning compost material;

support means for rotatably mounting said mandrel to said frame including a bearing for rotatably supporting said shaft and a support plate extending from said frame between said surface portions, said support plate having a support web extending between a pair of vertical side edges, said bearing being mounted to said web, said support plate extending with said web perpendicular said shaft in a position defining a passage between said web and each of said surface portions;

engine means mounted to said frame and connected with said shaft for rotating said mandrel;

a guard for said bearing for reducing the tendency of articles to become entangled in said bearing; and said guard including a shearing plate attached to one of said vertical side edges, said shearing plate having a pair of perimeter edges aligned with said surface portions and extending in opposite directions toward said surface portions, said guard further including at least one L-shaped member attached to each of said surface portions, said L-shaped member having a pair of side joined at a bight and a pair of perimeter edges away from said bight, said perimeter edges of said L-shaped member attached to the respective said surface portion and positioned to overlap a portion of said shearing plate.

15. The compost turner in claim 14 further including a second shearing plate attached to the other one of said vertical side edges, said second shearing plate having a pair of perimeter edges aligned with said surface portions and extending in opposite directions toward said surface portions.

16. The compost turner in claim 15 further including a third shearing plate attached to said web and extending in one direction toward one of said surface portions, said third shearing plate having a pair of perimeter edges aligned with the respective said surface portions.

17. The compost turner in claim 16 including a plurality of said L-shaped members distributed around each of said surface portions.

18. The compost turner in claim 14 including a plurality of said L-shaped members distributed around each of said surface portions.

19. The compost turner in claim 15 including a plurality of said L-shaped members distributed around each of said surface portions.

20. A guard for a compost turner for reducing the tendency of articles to become entangled in a bearing rotatably supporting a shaft, said shaft rotatably supporting a rotatable member, said bearing being supported by a stationary support member, said guard comprising:

a first shearing member mounted to said support member;

a second shearing member mounted to rotate in a circular motion about said shaft; and said first and second shearing members being mounted in positions overlying said bearing in a manner that will create a shearing action between said first and second shearing members as said rotatable member rotates such that debris travelling toward said bearing will be shredded by said shearing members before reaching said bearing.

21. A guard for a compost turner for reducing the tendency of articles to become entangled in a bearing rotatably supporting a shaft, said shaft rotatably supporting a rotatable member, said bearing being supported by a stationary support member, said guard comprising:

a first shearing member mounted to said support member;

a second shearing member mounted to rotate in a circular motion about said shaft;

said first and second shearing members being mounted in positions that will create a shearing action between said first and second shearing members as said rotatable member rotates;

a third shearing member mounted to said support member;

a fourth shearing member mounted to rotate in a circular motion about said shaft; and said third and fourth shearing members being mounted in positions that will create a shearing action between said third and fourth shearing members, between said first and third shearing members and between said second and fourth shearing members as said rotatable member rotates.

22. The compost turner guard in claim 21 wherein each of said shearing members defines a pair of spaced apart parallel shearing edges such that shearing action will be created at various times between all shearing edges of said first and third shearing members and all shearing edges of said second and fourth shearing members.

23. The compost turner guard in claim 22 wherein said first and third shearing members are substantially planar metal plates having parallel peripheral edges defining said shearing edges thereof.

24. The compost turner guard in claim 23 wherein said second and fourth shearing members are L-shaped metal members having parallel peripheral edges defining said shearing edges thereof.

* * * * *

UNITED STATES PATENT AND TRADEMARK OFFICE
CERTIFICATE OF CORRECTION

PATENT NO. : 5,001,894

DATED : March 26, 1991

INVENTOR(S) : James A. Slater

It is certified that error appears in the above-identified patent and that said Letters Patent is hereby corrected as shown below:

```
Column 1, line 5
    After "guards" insert --.--;

Column 7, Line 24
    "side" should be --sides--.
```

Signed and Sealed this

First Day of September, 1992

*Attest:*

DOUGLAS B. COMER

*Attesting Officer*   Acting Commissioner of Patents and Trademarks